United States Patent
Yu et al.

(10) Patent No.: US 11,108,955 B2
(45) Date of Patent: Aug. 31, 2021

(54) MOBILE TERMINAL-BASED DUAL CAMERA POWER SUPPLY CONTROL METHOD, SYSTEM AND MOBILE TERMINAL

(71) Applicant: TCL COMMUNICATIONS (NINGBO) CO., LTD., Ningbo (CN)

(72) Inventors: Bin Yu, Ningbo (CN); Weiqin Yang, Ningbo (CN)

(73) Assignee: TCL COMMUNICATIONS (NINGBO) CO., LTD., Ningbo (CN)

( * ) Notice: Subject to any disclaimer, the term of this patent is extended or adjusted under 35 U.S.C. 154(b) by 112 days.

(21) Appl. No.: 16/495,585

(22) PCT Filed: Mar. 16, 2018

(86) PCT No.: PCT/CN2018/079363
§ 371 (c)(1),
(2) Date: Nov. 19, 2019

(87) PCT Pub. No.: WO2018/171534
PCT Pub. Date: Sep. 27, 2018

(65) Prior Publication Data
US 2020/0092476 A1 Mar. 19, 2020

(30) Foreign Application Priority Data

Mar. 20, 2017 (CN) .......................... 201710166840.9

(51) Int. Cl.
*H04N 5/232* (2006.01)
*H04N 5/225* (2006.01)
*H04N 5/247* (2006.01)

(52) U.S. Cl.
CPC ....... *H04N 5/23241* (2013.01); *H04N 5/2257* (2013.01); *H04N 5/247* (2013.01)

(58) Field of Classification Search
CPC .. H04N 5/23241; H04N 5/2257; H04N 5/247; H04N 5/232411; H04N 5/232
See application file for complete search history.

(56) References Cited

U.S. PATENT DOCUMENTS 10,944,908 B2 * 3/2021 An ........................... G06T 7/80
2006/0056837 A1 3/2006 Vapaakoski
(Continued)

FOREIGN PATENT DOCUMENTS

CN 2817260 Y 9/2006
CN 103199693 A 7/2013
(Continued)

*Primary Examiner* — Nicholas G Giles
(74) *Attorney, Agent, or Firm* — Kirton McConkie; Evan R. Witt (57) ABSTRACT

Disclosed in the present disclosure are a mobile terminal-based dual camera power supply control method and system, and a mobile terminal. The method comprises: when it is detected that a user operational instruction or other applications start a camera, determining whether the current condition is a specific using condition; if yes, starting supplying power to a camera corresponding to a camera serial number and turning on i the camera; and if no, starting supplying power to a camera corresponding to a default camera serial number and turning on the camera.

16 Claims, 4 Drawing Sheets

(56) References Cited

U.S. PATENT DOCUMENTS

| | | | |
|---|---|---|---|
| 2007/0019094 A1* | 1/2007 | Silberstein | H04N 5/225 |
| | | | 348/333.01 |
| 2007/0024737 A1 | 2/2007 | Nakamura et al. | |
| 2018/0013955 A1* | 1/2018 | Kim | H04N 5/23238 |
| 2019/0199926 A1* | 6/2019 | An | H04N 5/23219 |

FOREIGN PATENT DOCUMENTS

| | | |
|---|---|---|
| CN | 104238707 A | 12/2014 |
| CN | 205123859 U | 3/2016 |
| CN | 106851111 A | 6/2017 |
| KR | 20140142010 A | 12/2014 |

\* cited by examiner

MOBILE TERMINAL-BASED DUAL CAMERA POWER SUPPLY CONTROL METHOD, SYSTEM AND MOBILE TERMINAL

CROSS REFERENCE

This application is a National Stage of International Application No. PCT/CN2018/079363, filed on Mar. 16, 2018, which claims the priority of Chinese Patent Application No. 201710166840.9, entitled "MOBILE TERMINAL-BASED DUAL CAMERA POWER SUPPLY CONTROL METHOD, SYSTEM AND MOBILE TERMINAL", filed on Mar. 20, 2017, the disclosure of which is incorporated herein by reference in its entirety.

FIELD OF THE INVENTION

The present disclosure relates to a mobile terminal, and more particularly to a control method and a control system for providing power to dual cameras of a mobile terminal and a related mobile terminal.

BACKGROUND

The camera/photograph function has become a standard function of a mobile terminal. In general, a camera is installed in the mobile terminal and connected the cameras to the central processing unit. The camera could detect the ambient environment and transfer it into an image data and send the image data to the central processing unit. The central processing unit processes the image data to obtain an image or a picture. In some mobile terminals, two cameras, a front camera and a back camera, are installed to improve the user experiences, such as self photographing or real-time video call. Conventionally, the two cameras are powered separately. That is, an independent circuit is used to supply power to the front camera and another independent circuit is used to supply power to the back camera. However, the user often uses only one camera and hardly uses both cameras at the same time. Therefore, the above-mentioned power system having two independent circuits to supply power may introduce a higher cost and needs to be improved.

It is required to improve the defect of the related art.

SUMMARY

Technical Problem

One objective of an embodiment of the present disclosure is to provide a control method and a control system for providing power to dual cameras of a mobile terminal and a related mobile terminal. In an embodiment of the present disclosure, one circuit is used to supply power to dual cameras such that the power consumption is reduced and the cost of the hardware is also reduced.

Solution to Technical Problem

According to an embodiment of the present disclosure, a control method for providing power to dual cameras of a mobile terminal is provided. The control method comprises:

presetting a default camera number and storing the default camera number in a memory of the mobile terminal, and simultaneously presetting a specific usage condition and a corresponding camera number and storing a corresponding relationship in the memory of the mobile terminal;

when an operation instruction for activating a camera from a user or an application is detected, determining whether a current condition is the specific usage condition; if yes, then activating and powering a camera corresponding to the corresponding camera number according to the corresponding camera number;

if the current condition is not the specific usage condition, then obtaining the default camera number and activating and powering a camera corresponding to the default camera number.

Optionally, before presetting the default camera number, the control method further includes using different switches to connect a front camera and a back camera of the mobile terminal to a same circuit to supply power;

wherein the front camera is connected to the same circuit through a first switch, the back camera is connected to the same circuit through a second switch, and the first switch and the second switch are respectively connected to a central processing unit and controlled by the central processing unit.

Optionally, the step of presetting a default camera number and storing the default camera number in a memory of the mobile terminal, and simultaneously presetting a specific usage condition and a corresponding camera number and storing a corresponding relationship in the memory of the mobile terminal, comprises:

assigning a front camera to a camera number 1 and assigning a back camera to a camera number 2;

presetting the default camera number as 1 when the mobile terminal is manufactured; and simultaneously presetting the specific usage condition and the corresponding camera number.

Optionally, the specific usage condition comprises a condition defined by a manufacturer of the mobile terminal or a condition set by an application installed by the user.

Optionally, the memory is a non-volatile memory.

Optionally, the control method further comprises:

manually revising the default camera number according to an operation instruction from a user and storing the changed default camera number into the memory to replace the default camera number originally stored in the memory.

According to an embodiment of the present disclosure, a control system for providing power to dual cameras of a mobile terminal is provided. The control system comprises: one or more processors; a memory; one or more program instructions, stored in the memory and executed by the one or more processors; wherein the one or more program instructions comprise:

a connection control module, configured to respectively use different switches to connect a front camera and a back camera of the mobile terminal to a same circuit to supply power, wherein the front camera is connected to the same circuit through a first switch, the back camera is connected to the same circuit through a second switch, and the first switch and the second switch are respectively connected to a central processing unit and controlled by the central processing unit respectively connecting a front camera;

a presetting module, configured to preset a default camera number and store the default camera number in a memory of the mobile terminal, and simultaneously preset a specific usage condition and a corresponding camera number and store a corresponding relationship in the memory of the mobile terminal;

a detection and determination module, configured to determine whether a current condition is the specific usage condition when an operation instruction for activating a camera from a user or an application is detected, and if yes, to activate and power a camera corresponding to the corresponding camera number according to the corresponding camera number; and a default activation module, configured to obtain the default camera number and activating and powering a camera corresponding to the default camera number if the current condition is not the specific usage condition.

Optionally, the presetting module comprises:

a presetting unit, configured to assign a front camera to a camera number 1 and assign a back camera to a camera number 2;

a default setting unit, configured to preset the default camera number as 1 when the mobile terminal is manufactured;

a specific setting unit, configured to simultaneously preset the specific usage condition and the corresponding camera number; and a manual setting unit, configured to manually revise the default camera number according to an operation instruction from a user and store the changed default camera number into the memory to replace the default camera number originally stored in the memory.

Optionally, the specific usage condition comprises a condition defined by a manufacturer of the mobile terminal or a condition set by an application installed by the user.

Optionally, the memory is a non-volatile memory.

According to an embodiment of the present disclosure, a mobile terminal is provided. The mobile terminal comprises a front camera and a back camera, wherein the front camera and the back camera are connected to a same circuit respectively through a first switch and a second switch, and the first switch and the second switch are respectively connected to a central processing unit and controlled by the central processing unit; the central processing unit of the mobile terminal executes following operations:

presetting a default camera number and storing the default camera number in a memory of the mobile terminal, and simultaneously presetting a specific usage condition and a corresponding camera number and storing a corresponding relationship in the memory of the mobile terminal;

when an operation instruction for activating a camera from a user or an application is detected, determining whether a current condition is the specific usage condition; if the current condition is the specific usage condition, activating and powering a camera corresponding to the corresponding camera number according to the corresponding camera number; after determining a camera to be used, supplying power to the camera to be used through turning on one switch of the first switch and the second switch and turning off the other switch of the first switch and the second switch; and if the current condition is not the specific usage condition, obtaining the default camera number and activating and powering a camera corresponding to the default camera number.

Optionally, the operations of presetting a default camera number and storing the default camera number in a memory of the mobile terminal, and simultaneously presetting a specific usage condition and a corresponding camera number and storing a corresponding relationship in the memory of the mobile terminal, comprise:

assigning a front camera to a camera number 1 and assigning a back camera to a camera number 2;

presetting the default camera number as 1 when the mobile terminal is manufactured; and simultaneously presetting the specific usage condition and the corresponding camera number.

Optionally, the specific usage condition comprises a condition defined by a manufacturer of the mobile terminal or a condition set by an application installed by the user.

Optionally, the memory is a non-volatile memory.

Optionally, the mobile terminal further executes a following step:

manually revising the default camera number according to an operation instruction from a user and storing the changed default camera number into the memory to replace the default camera number originally stored in the memory.

Optionally, the operation of when an operation instruction for activating a camera from a user or an application is detected, determining whether a current condition is the specific usage condition, comprises:

when power of a battery of the mobile terminal is detected to be lower than 10%, using the back camera by supplying power to the back camera through the second switch and disconnecting the first switch.

Optionally, the operation of when an operation instruction for activating a camera from a user or an application is detected, determining whether a current condition is the specific usage condition, comprises:

when a function of alipay is detected to be activated, using the back camera by supplying power to the back camera through the second switch and disconnecting the first switch.

Optionally, the operation of when an operation instruction for activating a camera from a user or an application is detected, determining whether a current condition is the specific usage condition, comprises:

when a Bluetooth function is detected to be activated, using the back camera by supplying power to the back camera through the second switch and disconnecting the first switch.

Advantageous Effect

In contrast to the conventional art, the present disclosure provides a control method and a control system for providing power to dual cameras of a mobile terminal and a related mobile terminal. The control method presets a default camera number and stores the default camera number in a memory of the mobile terminal, simultaneously presets a specific usage condition and a corresponding camera number and stores a corresponding relationship in the memory of the mobile terminal, determines whether a current condition is the specific usage condition when an operation instruction for activating a camera from a user or an application is detected, if yes, then activates and powers a camera corresponding to the corresponding camera number according to the corresponding camera number, and obtains the default camera number and activates and powering a camera corresponding to the default camera number if the current condition is not the specific usage condition. In this way, one independent circuit is required to supply power to the dual cameras such that the power consumption is reduced and the cost of hardware is also reduced.

DETAILED DESCRIPTION OF PREFERRED EMBODIMENTS

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

Figure 1:
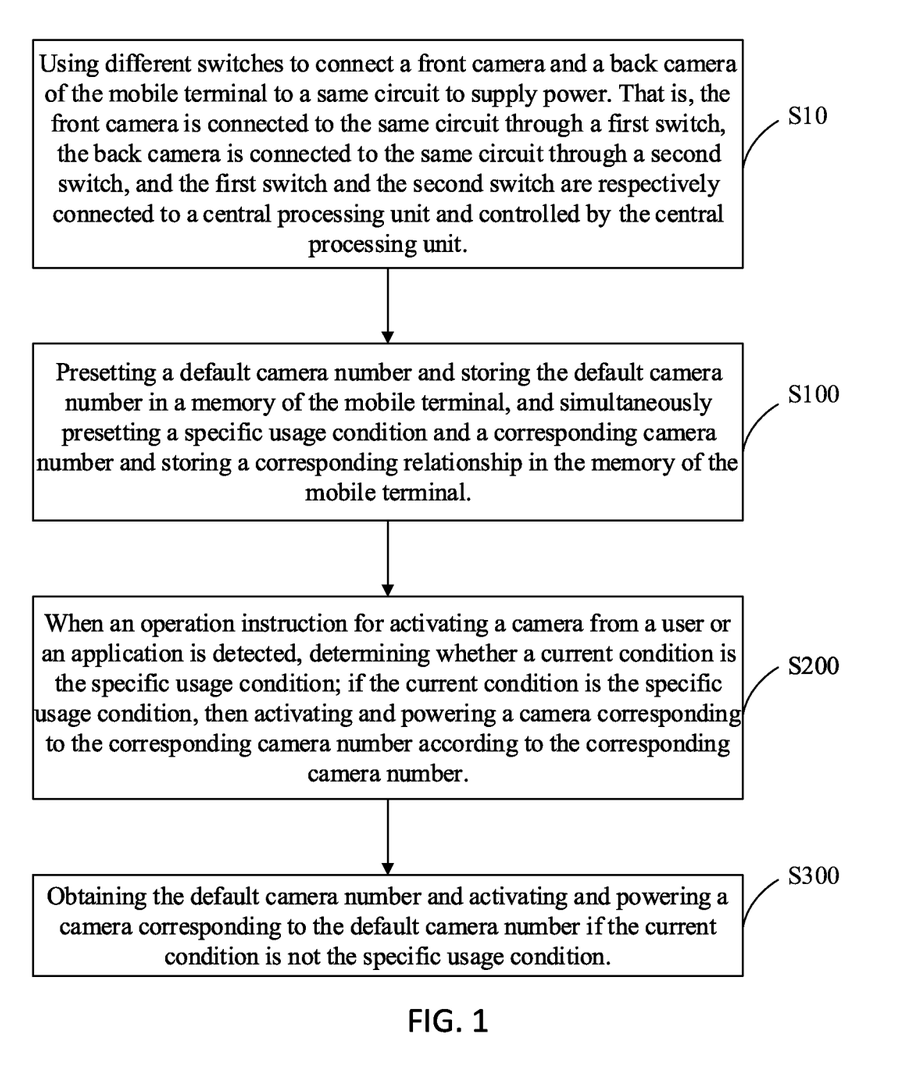
FIG. 1 is a flow chart of a control method for supplying power to dual cameras of a mobile terminal according to an embodiment of the present disclosure.

Please refer to FIG. 1. FIG. 1 is a flow chart of a control method for supplying power to dual cameras of a mobile terminal according to an embodiment of the present disclosure. As shown in FIG. 1, the control method for supplying power to dual cameras of a mobile terminal comprises the following steps:

Step S10: using different switches to connect a front camera and a back camera of the mobile terminal to a same circuit to supply power. That is, the front camera is connected to the same circuit through a first switch, the back camera is connected to the same circuit through a second switch, and the first switch and the second switch are respectively connected to a central processing unit and controlled by the central processing unit.

Figure 2:
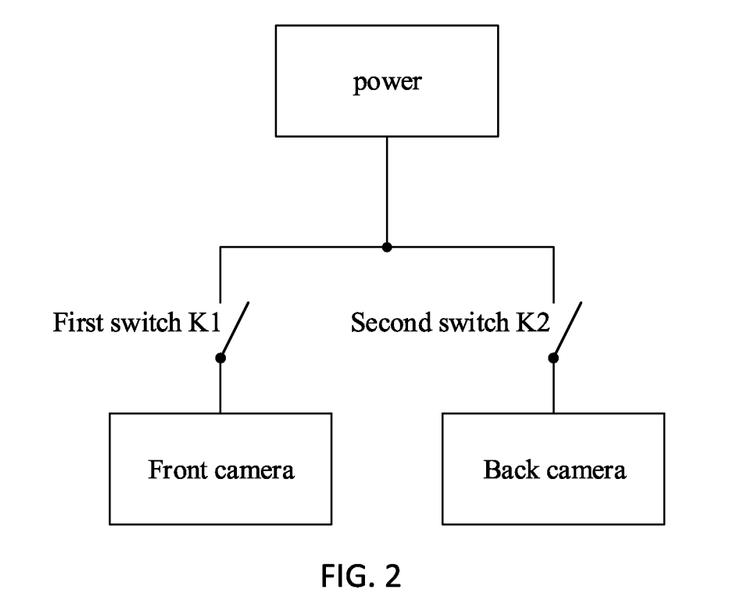
FIG. 2 is a diagram of a power connection structure of a mobile terminal having dual cameras according to an embodiment of the present disclosure.
Figure 3:
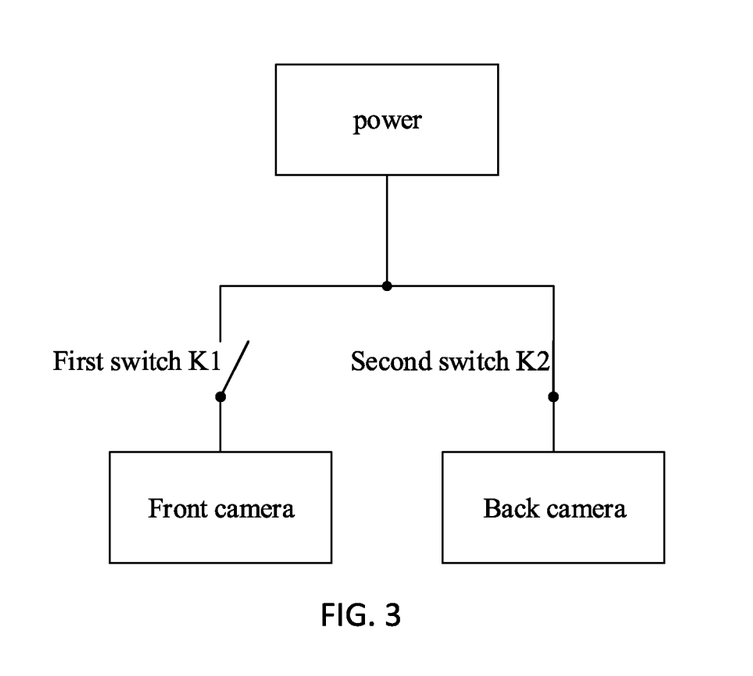
FIG. 3 is a diagram showing conditions of switches in the power connection structure shown in FIG. 2.

In the actual implementation, the front camera and the back camera are respectively pre-connected to the same circuit through different switches for power supply. As shown in FIG. 2 and FIG. 3, in an embodiment, the front camera is connected to the same power supply circuit through the first switch K1 and the back camera is connected to the same power supply circuit through the second switch K2. The first switch K1 and the second switch K2 are respectively connected to the central processing unit and controlled by the central processing unit.

Step S100: presetting a default camera number and storing the default camera number in a memory of the mobile terminal, and simultaneously presetting a specific usage condition and a corresponding camera number and storing a corresponding relationship in the memory of the mobile terminal.

Specifically, the step S100 comprises:

pre-assigning a front camera to a camera number 1, pre-assigning a back camera to a camera number 2, and presetting the default camera number as 1 when the mobile terminal is manufactured. That is, the number 1 represents the front camera and the number 2 represents the back camera.

In this embodiment, the control method further simultaneously presets the specific usage condition and the corresponding camera number because some applications could only use a specific camera. For example, the Alipay application could only use the back camera. The aforementioned specific usage condition could comprise a specific condition defined by a manufacturer of the mobile terminal. For example, the manufacture could define that only the back camera could be used when the battery power is lower than 10%. Furthermore, the aforementioned specific usage condition could comprise a specific condition defined by specific applications. As previously mentioned, when the Alipay function is performed, only the back camera could be used.

The specific condition defined by the manufacturer could be recorded in a text file as below:

Battery power is lower than 10%, 2;
Activating Bluetooth, 1.

In the above content of a text file, each row represents a condition and a corresponding camera number. For example, the description "Battery power is lower than 10%, 2" represents that only the back camera could be used when the battery power is lower than 10%. The description "Activating Bluetooth, 1" represents that only the front camera could be used when the Bluetooth function is activated.

As to the specific conditions defined by the applications (such as the above-mentioned example of Alipay application), these could be defined by the application providers.

Further, the user could manually revise the default camera number and the revised camera number will be stored into the memory to replace the originally-stored camera number. For example, the user could revise the default camera number to 2 through a setting menu.

The memory is a non-volatile memory, which means that the data could be stored when the power is off, such as flash memory or EMMC.

Step S200: when an operation instruction for activating a camera from a user or an application is detected, determining whether a current condition is the specific usage condition; if the current condition is the specific usage condition, then activating and powering a camera corresponding to the corresponding camera number according to the corresponding camera number.

When detecting that a camera is being activated, it needs to know which camera (the front camera or the back camera) is being activated. In this embodiment, the text file, which is pre-stored when the mobile terminal is manufactured, is obtained to perform the determination process through each row of the text file. If a condition in a row complies with the current condition of the mobile terminal, then the number in the row is used to activate the corresponding camera. For example, if the current condition is that the battery power is lower than 10%, then the back camera corresponding to the camera number 2 is used.

After determining which camera should be used, a switch of the first and the second switches is selected to connect the power to the camera for power supply. In other words, in this embodiment, the two switches are utilized to connect the power to the camera to be used.

For example, when the battery power is lower than 10%, the back camera, corresponding to the camera number 2, is connected to the power through the selected switch.

Step S300: obtaining the default camera number and activating and powering a camera corresponding to the default camera number if the current condition is not the specific usage condition.

Specifically, if the current condition does not comply with any one of the specific conditions in the text file, then the mobile terminal obtains the default camera number to activate the camera corresponding to the default camera number. In this embodiment, a switch selection operation is performed (as shown in FIG. 2) to connect the power to the camera.

For example, if the default camera number is 2, then the back camera corresponding to the default camera number 2 is activated by selecting the second switch K2 (the second switch K2 is turned on and the first switch K1 is turned off) to connect the back camera to the power.

Accordingly, the present disclosure provides a control method for providing power to dual cameras of a mobile terminal. The control method presets a default camera number and stores the default camera number in a memory of the mobile terminal, simultaneously presets a specific usage condition and a corresponding camera number and stores a corresponding relationship in the memory of the mobile terminal, determines whether a current condition is the specific usage condition when an operation instruction for activating a camera from a user or an application is detected, if yes, then activates and powers a camera corresponding to the corresponding camera number according to the corresponding camera number, and obtains the default camera number and activates and powering a camera corresponding to the default camera number if the current condition is not the specific usage condition. In this way, one independent circuit is required to supply power to the dual cameras such that the power consumption is reduced and the cost of hardware is also reduced.

Figure 4:
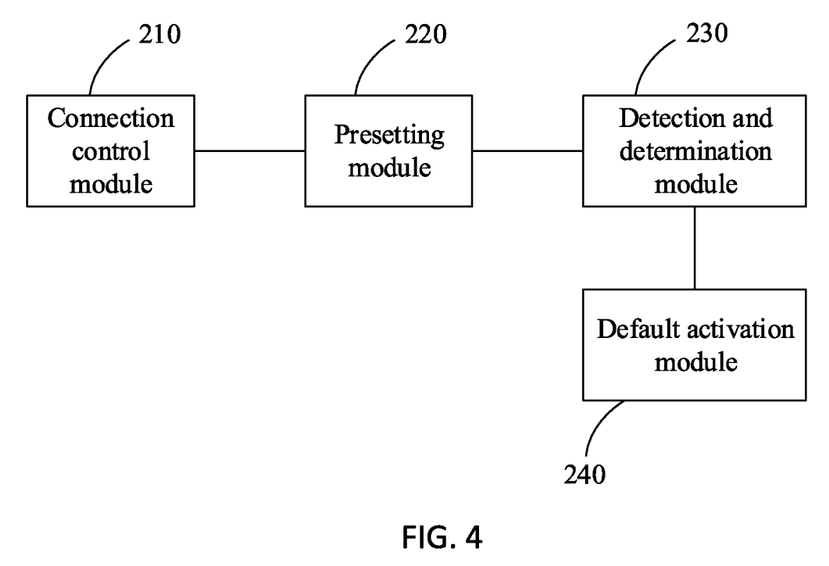
FIG. 4 is a functional block diagram of a control system for supplying power to dual cameras of a mobile terminal according to an embodiment of the present disclosure.

According to the above embodiment, a control system is further provided. As shown in FIG. 4, the control system comprises a connection control module 210, a presetting module 220, a detection and determination module 230 and a default activation module 240.

The connection control module 210 is used to respectively use different switches to connect a front camera and a back camera of the mobile terminal to a same circuit to supply power. That is, the front camera is connected to the same circuit through a first switch, the back camera is connected to the same circuit through a second switch, and the first switch and the second switch are respectively connected to a central processing unit and controlled by the central processing unit respectively connecting a front camera.

The presetting module 220 is used to preset a default camera number and store the default camera number in a memory of the mobile terminal, and simultaneously preset a specific usage condition and a corresponding camera number and store a corresponding relationship in the memory of the mobile terminal.

The detection and determination module 230 is used to determine whether a current condition is the specific usage condition when an operation instruction for activating a camera from a user or an application is detected, and if yes, to activate and power a camera corresponding to the corresponding camera number according to the corresponding camera number.

The default activation module 240 is used to obtain the default camera number and activating and powering a camera corresponding to the default camera number if the current condition is not the specific usage condition.

Preferably, the presetting module comprises a presetting unit, a default setting unit and a specific setting unit and a manual setting unit.

The presetting unit is used to assign a front camera to a camera number 1 and assign a back camera to a camera number 2.

The default setting unit is used to preset the default camera number as 1 when the mobile terminal is manufactured.

The specific setting unit is used to simultaneously preset the specific usage condition and the corresponding camera number.

The manual setting unit is used to manually revise the default camera number according to an operation instruction from a user and store the changed default camera number into the memory to replace the default camera number originally stored in the memory.

Furthermore, as previously mentioned, the specific usage condition comprises a condition defined by a manufacturer of the mobile terminal or a condition set by an application installed by the user.

In this embodiment, the memory is a non-volatile memory.

According to an embodiment of the present disclosure, a mobile terminal is provided. As shown in FIG. 2 and FIG. 3, the mobile terminal comprises a front camera and a back camera. The front camera and the back camera of the mobile terminal are connected to a same circuit through different switches to supply power. That is, the front camera is connected to the same circuit through a first switch, the back camera is connected to the same circuit through a second switch, and the first switch and the second switch are respectively connected to a central processing unit and controlled by the central processing unit respectively connecting a front camera.

Figure 5:
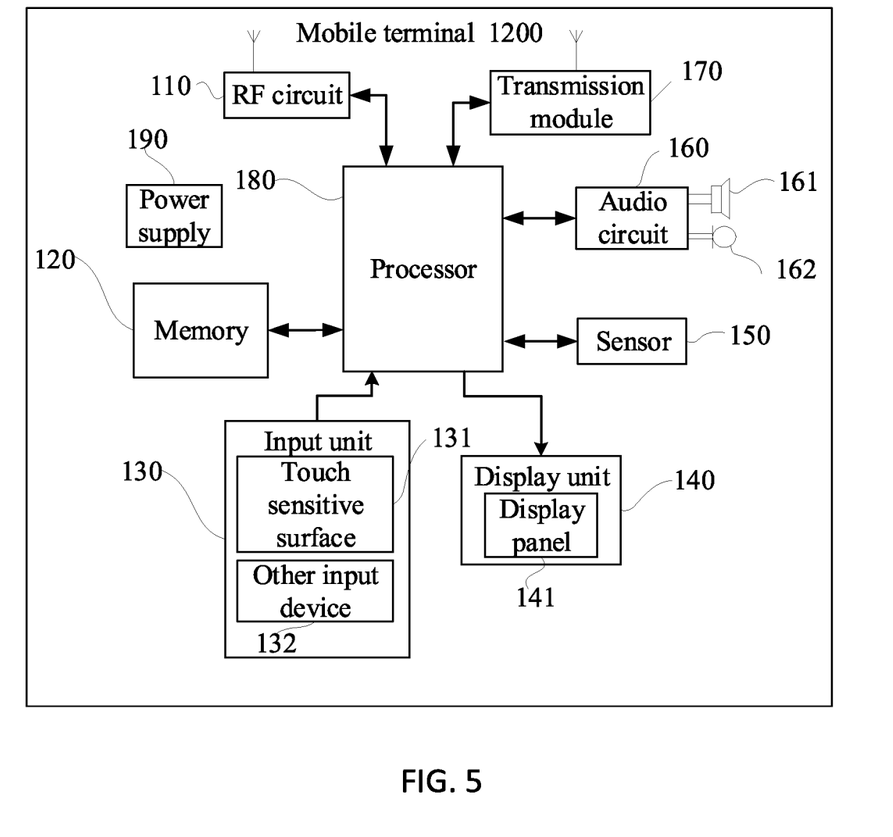
FIG. 5 is a diagram of a mobile terminal according to an embodiment of the present disclosure.

Please refer to FIG. 5. FIG. 5 is a diagram of a mobile terminal according to an embodiment of the present disclosure. The mobile terminal 1200 could be used to implement the above-mentioned control system and/or control method. The mobile terminal 1200 can be a smart phone or a tablet.

As shown in FIG. 5, the mobile terminal 1200 can comprise a radio frequency (RF) circuit 110, a memory 120 having one or more machine readable media (only one medium is shown in FIG. 5), an input unit 130, a display unit 140, a sensor 150, an audio circuit 160, a transmission module 170, a processor (such as central processing unit) 180 having one or more processing cores (only one is shown in FIG. 5), and a power supply 190. Please note, the above-mentioned structure of the mobile terminal 1200 is not a limitation of the present disclosure. In the actual implementation, the mobile terminal 1200 can comprises more or less components, combine some components, or have different arrangement.

The RF circuit 110 may be configured to receive and send a signal during an information receiving and sending process or a conversation process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1200, and the like. In addition, the memory 120 may include a high speed random access memory, and may also include a non-volatile memory, such as at least one magnetic disk storage device, a flash memory device, or another volatile solid-state storage device. Correspondingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and other input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface sound wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the terminal 1200. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 10, the touch-sensitive surface 131 and the display panel 141 are used as two separate parts to implement input and output functions, in some embodiments, the touch-sensitive surface 131 and the display panel 141 may be integrated to implement the input and output functions.

The terminal 1200 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1200 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the terminal 1200 are not further described herein.

The audio circuit 160, a loudspeaker 161, and a microphone 162 may provide audio interfaces between the user and the terminal 1200. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1200.

The terminal 1200 may help, by using the transmission module 170 (e.g. Wi-Fi module), a user to receive and send an e-mail, browse a webpage, and access stream media, and the like, which provides wireless broadband Internet access for the user. Although FIG. 3 shows the transmission module 170, it may be understood that, the wireless communications unit is not a necessary component of the terminal 1200, and can be ignored according to demands without changing the scope of the essence of the present disclosure.

The processor 180 is a control center of the terminal 1200, and connects various parts of the terminal by using various interfaces and lines. By running or executing the software program and/or module stored in the memory 120, and invoking data stored in the memory 120, the processor 180 performs various functions and data processing of the terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may not be integrated into the processor 180.

The terminal 1200 further includes the power supply 190 (such as a battery) for supplying power to the components. Preferably, the power supply may be logically connected to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

The mobile terminal 1200 could further comprise cameras (such as a front camera and a back camera) or a Bluetooth module. The display unit 140 is a touch panel display. The memory 120 could store one or more programs. These programs can be arranged to be executed by one or more processors (or processing cores) to perform the following operations:

presetting a default camera number and storing the default camera number in a memory of the mobile terminal, and simultaneously presetting a specific usage condition and a corresponding camera number and storing a corresponding relationship in the memory of the mobile terminal;

when an operation instruction for activating a camera from a user or an application is detected, determining whether a current condition is the specific usage condition; if the current condition is the specific usage condition, activating and powering a camera corresponding to the corresponding camera number according to the corresponding camera number; after determining a camera to be used, supplying power to the camera to be used through turning on one switch of the first switch and the second switch and turning off the other switch of the first switch and the second switch; and if the current condition is not the specific usage condition, obtaining the default camera number and activating and powering a camera corresponding to the default camera number.

The operations of presetting a default camera number and storing the default camera number in a memory of the mobile terminal, and simultaneously presetting a specific usage condition and a corresponding camera number and storing a corresponding relationship in the memory of the mobile terminal, comprise:

assigning a front camera to a camera number 1 and assigning a back camera to a camera number 2;

presetting the default camera number as 1 when the mobile terminal is manufactured; and simultaneously presetting the specific usage condition and the corresponding camera number.

The specific usage condition comprises a condition defined by a manufacturer of the mobile terminal or a condition set by an application installed by the user.

The memory is a non-volatile memory.

The mobile terminal further executes a following operation:

manually revising the default camera number according to an operation instruction from a user and storing the changed default camera number into the memory to replace the default camera number originally stored in the memory.

The operation of when an operation instruction for activating a camera from a user or an application is detected, determining whether a current condition is the specific usage condition, comprises:

When power of a battery of the mobile terminal is detected to be lower than 10%, using the back camera by supplying power to the back camera through the second switch and disconnecting the first switch.

The operation of when an operation instruction for activating a camera from a user or an application is detected, determining whether a current condition is the specific usage condition, comprises:

when a function of alipay is detected to be activated, using the back camera by supplying power to the back camera through the second switch and disconnecting the first switch.

The operation of when an operation instruction for activating a camera from a user or an application is detected, determining whether a current condition is the specific usage condition, comprises:

when a Bluetooth function is detected to be activated, using the back camera by supplying power to the back camera through the second switch and disconnecting the first switch.

In sum, the present disclosure provides a control method and a control system for providing power to dual cameras of a mobile terminal and a related mobile terminal. The control method presets a default camera number and stores the default camera number in a memory of the mobile terminal, simultaneously presets a specific usage condition and a corresponding camera number and stores a corresponding relationship in the memory of the mobile terminal, determines whether a current condition is the specific usage condition when an operation instruction for activating a camera from a user or an application is detected, if yes, then activates and powers a camera corresponding to the corresponding camera number according to the corresponding camera number, and obtains the default camera number and activates and powering a camera corresponding to the default camera number if the current condition is not the specific usage condition. In this way, one independent circuit is required to supply power to the dual cameras such that the power consumption is reduced and the cost of hardware is also reduced.

In this embodiment, a storage medium is provided. The storage medium stores programs. The programs are executed to perform the above-mentioned control method for supply power to the dual cameras of a mobile terminal.

One having ordinary skills in the art could understand that all or part of the above-mentioned control method could be implemented by a hardware (such as processor or controller) executing programs. The programs can be stored in a machine readable medium such that the above-mentioned process flow of the control method could be performed when the programs are executed. The machine readable storage medium can be a memory, a memory, a hard disk, an optical disk, and/or etc.

Above are embodiments of the present disclosure, which does not limit the scope of the present disclosure. Any modifications, equivalent replacements or improvements within the spirit and principles of the embodiment described above should be covered by the protected scope of the invention.

What is claimed is:

1. A control method for providing power to dual cameras of a mobile terminal, the control method comprising:

presetting a default camera number and storing the default camera number in a memory of the mobile terminal, and simultaneously presetting a specific usage condition and a corresponding camera number and storing a corresponding relationship in the memory of the mobile terminal;

when an operation instruction for activating a camera from a user or an application is detected, determining whether a current condition is the specific usage condition; if the current condition is the specific usage condition, activating and powering a camera corresponding to the corresponding camera number according to the corresponding camera number; and if the current condition is not the specific usage condition, obtaining the default camera number and activating and powering a camera corresponding to the default camera number.

2. The control method of claim 1, further comprising:
before presetting the default camera number, using different switches to connect a front camera and a back camera of the mobile terminal to a same circuit to supply power;
wherein the front camera is connected to the same circuit through a first switch, the back camera is connected to the same circuit through a second switch, and the first switch and the second switch are respectively connected to a central processing unit and controlled by the central processing unit.

3. The control method of claim 1, wherein the step of presetting a default camera number and storing the default camera number in a memory of the mobile terminal, and simultaneously presetting a specific usage condition and a corresponding camera number and storing a corresponding relationship in the memory of the mobile terminal, comprises:
assigning a front camera to a camera number 1 and assigning a back camera to a camera number 2;
presetting the default camera number as 1 when the mobile terminal is manufactured; and
simultaneously presetting the specific usage condition and the corresponding camera number.

4. The control method of claim 1, wherein the specific usage condition comprises a condition defined by a manufacturer of the mobile terminal or a condition set by an application installed by the user.

5. The control method of claim 1, wherein the memory is a non-volatile memory.

6. The control method of claim 1, further comprising:
manually revising the default camera number according to an operation instruction from a user.

7. A control system for providing power to dual cameras of a mobile terminal, the control system comprising:
one or more processors;
a memory;
one or more program instructions, stored in the memory and executed by the one or more processors;
wherein the one or more program instructions comprise:
a connection control module, configured to respectively use different switches to connect a front camera and a back camera of the mobile terminal to a same circuit to supply power, wherein the front camera is connected to the same circuit through a first switch, the back camera is connected to the same circuit through a second switch, and the first switch and the second switch are connected to a central processing unit and controlled by the central processing unit;
a presetting module, configured to preset a default camera number and store the default camera number in a memory of the mobile terminal, and simultaneously preset a specific usage condition and a corresponding camera number and store a corresponding relationship in the memory of the mobile terminal;
a detection and determination module, configured to determine whether a current condition is the specific usage condition when an operation instruction for activating a camera from a user or an application is detected, and to activate and power a camera corresponding to the corresponding camera number according to the corresponding camera number if the current condition is the specific usage condition; and
a default activation module, configured to obtain the default camera number and activating and powering a camera corresponding to the default camera number if the current condition is not the specific usage condition.

8. The control system of claim 7, wherein the presetting module comprises:
a presetting unit, configured to assign a front camera to a camera number 1 and assign a back camera to a camera number 2;
a default setting unit, configured to preset the default camera number as 1 when the mobile terminal is manufactured;
a specific setting unit, configured to simultaneously preset the specific usage condition and the corresponding camera number; and
a manual setting unit, configured to manually revise the default camera number according to an operation instruction from a user.

9. The control system of claim 7, wherein the specific usage condition comprises a condition defined by a manufacturer of the mobile terminal or a condition set by an application installed by the user.

10. A mobile terminal, comprising a front camera and a back camera, wherein the front camera and the back camera are connected to a same circuit respectively through a first switch and a second switch, and the first switch and the second switch are respectively connected to a central processing unit and controlled by the central processing unit;
wherein the mobile terminal executes following operations:
presetting a default camera number and storing the default camera number in a memory of the mobile terminal, and simultaneously presetting a specific usage condition and a corresponding camera number and storing a corresponding relationship in the memory of the mobile terminal;
when an operation instruction for activating a camera from a user or an application is detected, determining whether a current condition is the specific usage condition; if the current condition is the specific usage condition, activating and powering a camera corresponding to the corresponding camera number according to the corresponding camera number;
after determining a camera to be used, supplying power to the camera to be used through turning on one switch of the first switch and the second switch and turning off the other switch of the first switch and the second switch; and
if the current condition is not the specific usage condition, obtaining the default camera number and activating and powering a camera corresponding to the default camera number.

11. The mobile terminal of claim 10, wherein the operations of presetting a default camera number and storing the default camera number in a memory of the mobile terminal, and simultaneously presetting a specific usage condition and a corresponding camera number and storing a corresponding relationship in the memory of the mobile terminal, comprise:
assigning the front camera to a camera number 1 and assigning the back camera to a camera number 2;
presetting the default camera number as 1 when the mobile terminal is manufactured; and
simultaneously presetting the specific usage condition and the corresponding camera number.

12. The mobile terminal of claim 10, wherein the specific usage condition comprises a condition defined by a manufacturer of the mobile terminal or a condition set by an application installed by the user.

13. The mobile terminal of claim 10, wherein the memory is a non-volatile memory.

14. The mobile terminal of claim 10, wherein the mobile terminal further executes a following operation:
 manually revising the default camera number according to an operation instruction from a user.

15. The mobile terminal of claim 10, wherein the operation of when an operation instruction for activating a camera from a user or an application is detected, determining whether a current condition is the specific usage condition, comprises:
 when power of a battery of the mobile terminal is detected to be lower than 10%, using the back camera by supplying power to the back camera through the second switch and disconnecting the first switch.

16. The mobile terminal of claim 10, wherein the operation of when an operation instruction for activating a camera from a user or an application is detected, determining whether a current condition is the specific usage condition, comprises:
 when a Bluetooth function is detected to be activated, using the back camera by supplying power to the back camera through the second switch and disconnecting the first switch.

* * * * *